(12) United States Patent
Gorey

(10) Patent No.: US 6,393,814 B1
(45) Date of Patent: May 28, 2002

(54) MOBILE VERTICAL CUTTER

(76) Inventor: Kim Gorey, 16 Palmerston St., Mosman Park WA (AU), 6012

( * ) Notice: Subject to any disclaimer, the term of this patent is extended or adjusted under 35 U.S.C. 154(b) by 0 days.

(21) Appl. No.: 09/705,238

(22) Filed: Nov. 3, 2000

(51) Int. Cl.[7] .............................................. A01B 33/02
(52) U.S. Cl. .......................................................... 56/229
(58) Field of Search ........................ 56/6, 7, 16.7, 364, 56/229, 370, 372, 366, 400.02; 172/79, 620, 621, 622

(56) References Cited

U.S. PATENT DOCUMENTS

| | | | |
|---|---|---|---|
| 1,509,468 A | * 9/1924 | Braun | 56/7 |
| 3,859,777 A | * 1/1975 | Doering | 56/16.7 |
| 3,993,143 A | 11/1976 | Moreland, Jr. | |
| 4,481,755 A | * 11/1984 | Carr | 56/7 |
| 4,776,404 A | 10/1988 | Rogers et al. | |
| 5,038,868 A | * 8/1991 | Rinelli | 172/48 |
| 5,408,813 A | 4/1995 | Haban et al. | |
| 6,237,695 B1 | * 5/2001 | Pierce et al. | 172/79 |

FOREIGN PATENT DOCUMENTS

| | | |
|---|---|---|
| AU | B1-39 72/78 | 3/1980 |
| WO | WO 91/16810 | 11/1991 |

* cited by examiner

*Primary Examiner*—Robert E. Pezzuto

(57) ABSTRACT

A mobile vertical cutter (10) for making vertical cuts in the turf includes a plurality of spindles (12) having a plurality of blades radially extending therefrom. The spindles are arranged into at least a first row (18) and a second row (20) offset from the first row. A drive mechanism (14) is provided for rotating the spindles. The bladed spindles and drive mechanism are mounted on a mobile frame (16). Each spindle is adapted to follow the contours of the turf as the mobile vertical cutter travels along.

11 Claims, 4 Drawing Sheets

MOBILE VERTICAL CUTTER

The present invention relates to an apparatus for cutting grass, and in particular, for making vertical cuts in turf.

Turf, or grass generally, often requires maintenance, particularly on sporting grounds where the condition of the grass is important. Vertical cutting of the grass provides the correct conditioning to the grass by breaking up the grass runners and roots and removing dead turf, commonly known as dethatching. Vertical cutting is commonly known as verti-cutting in the turf maintenance trade.

Verti-cutting units have been developed with a plurality of blades radially extending from a spindle for verti-cutting the grass as the blades spin and move over the surface of the grass.

However most sporting grounds are quite large and these rollers are limited in size, therefore verti-cutting a large area can be very time consuming. Simply increasing the size of the verti-cutting unit is not a solution as the ground is often undulating. A verti-cutting unit that is too large would not work properly on undulating ground. In addition, obstacles such as sprinklers are sometimes in the way and need to be avoided, a large verti-cutting unit would make avoiding obstacles more difficult.

It is an object of the present invention to provide a mobile vertical cutter which can provide more effective vertical cutting of turf.

In accordance with the present invention there is provided a mobile vertical cutter for making vertical cuts in turf, said mobile vertical cutter including:

a plurality of spindles, each spindle having a plurality of blades radially extending therefrom for making vertical cuts in turf, said spindles being arranged into at least a first row and a second row offset from the first row, each spindle being adapted to follow contours of the turf;

a drive mechanism for rotating each of the spindles; and, a mobile frame having the bladed spindles and drive mechanism mounted thereon, whereby in use, as the mobile cutter moves along, the spindles follow the contours of the turf, the drive mechanism rotates the spindles with respect to the frame and the blades make vertical cuts in the turf.

Typically, the first row has two spindles spaced apart from one another, and the second row has a spindle substantially in line with the space between the two spindles of the first row, whereby in use, a swath of the turf is vertically cut as the mobile cutter moves along.

Preferably, the drive mechanism includes a separate drive motor for each spindle, whereby each spindle can be driven independently of the other spindles. Preferably said drive motor is a hydraulic motor coupled to each respective spindle.

Typically, each of the spindles is mounted on the mobile frame by a lifting means, for lifting the respective spindle in relation to the frame.

Preferably, the lifting means of each spindle of the first row includes a first hydraulic ram, arranged to lift the respective spindle upwards and pivot the respective spindles to a substantially vertical orientation.

Preferably, the lifting means of the spindle of the second row includes a second hydraulic ram, arranged to lift the roller horizontally upwards.

Advantageously, each spindle is adapted to be laterally pivotable thereby allowing the spindle to better follow the contours of the turf.

Advantageously, the lifting means of each spindle is adapted to allow up and down movement of each respective spindle to allow it to better follow the contours of the turf.

Advantageously, the depth that the blades of each spindle penetrate into the turf is adjustable.

In one embodiment, the mobile vertical cutter is towed behind a vehicle. In a second embodiment, the mobile vertical cutter is self-propelled.

BRIEF DESCRIPTION OF THE DRAWINGS

In order to provide a better understanding, a preferred embodiment of the present invention will now be described in detail, by way of example only, with reference to the accompanying drawings in which.

BRIEF DESCRIPTION OF THE PREFERRED EMBODIMENT

Figure 1:
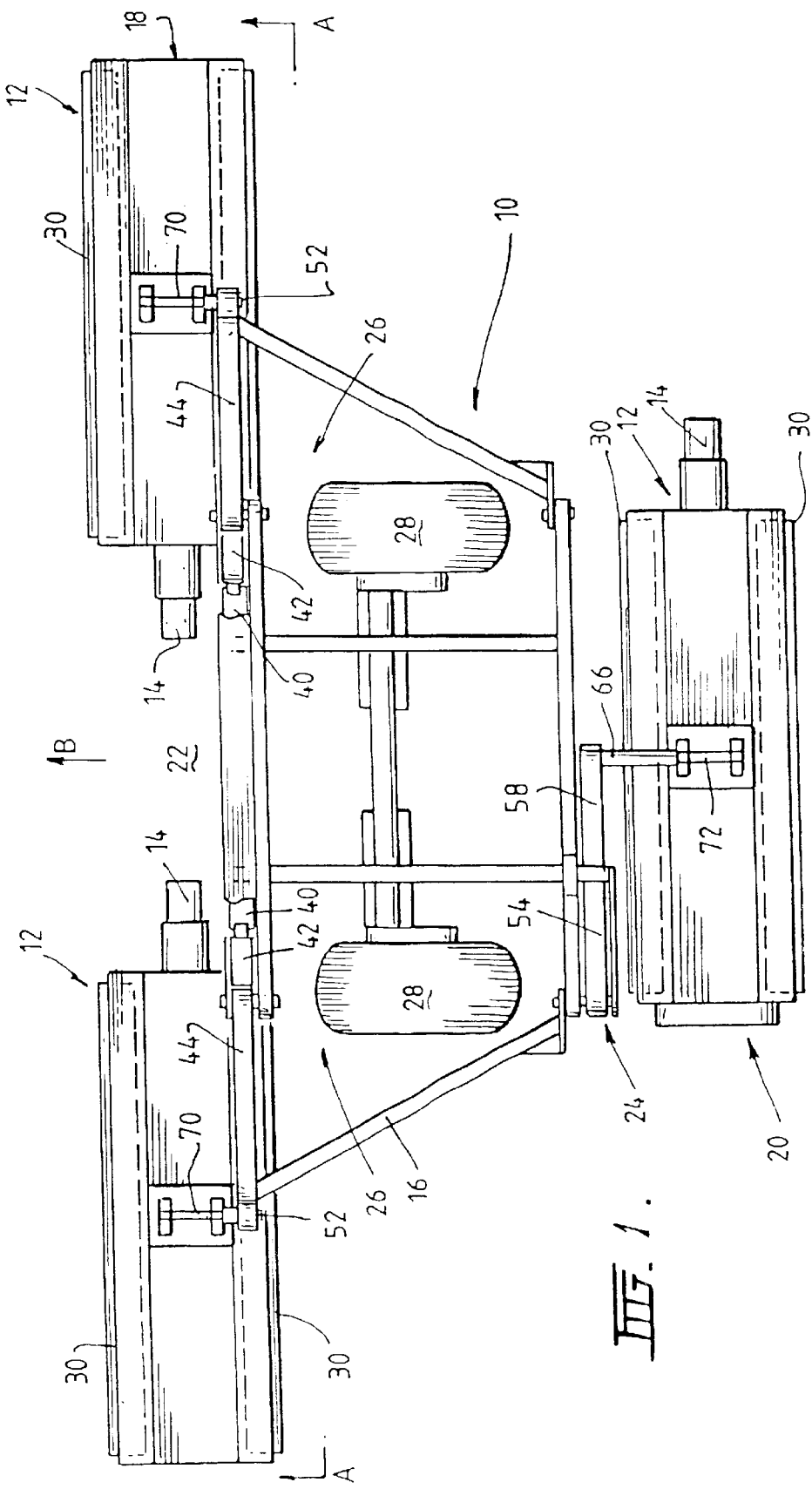
FIG. 1 is a plan view of one embodiment of a mobile vertical cutter in accordance with the present invention.

Referring to FIGS. 1 to 4, there is shown one embodiment of a mobile vertical cutter 10 which includes a plurality of vertical cutting units 12, a drive mechanism 14 and a mobile frame 16. Each vertical cutting unit 12 includes a plurality of blades 15 radially extending from a spindle 13, preferably in a cork screw configuration. Other arrangements of the blades are possible. The bladed spindles 13 are arranged to be close to the ground which the mobile vertical cutter 10 travels over, such that, in use, the blades penetrate the turf and make vertical cuts therein. The blades 15 and spindle 13 are shown in FIG. 3A. For the purpose of illustration, the blades 15 are not shown in cork screw configuration in FIG. 3A.

The vertical cutting units 12 are divided into a first row 18 and a second row 20. The first row 18 has two vertical cutting units 12 spaced apart from one another by a gap 22 and the second row 20 has one vertical cutting unit 12. The vertical cutting unit 12 of the second row 20 is substantially in line with the gap 22, along the direction of travel of the mobile vertical cutter 10, so that in effect, a continuous transverse length or swath of turf will be vertically cut as the mobile vertical cutter 10 travels along. The gap 22 is narrower than vertical cutting unit 12 of the second row 20 in order to provide an overlap with the vertical cuts made by the vertical cutting units 12 of the first row 18 so that the swath of turf vertically cut is continuous. This can be most clearly seen in FIG. 1. Each overlap may be about 100 mm.

The vertical cutting units 12 of the first row 18 are each mounted on the mobile frame 16 by a lifting means 26, which includes an hydraulic ram 40 which is arranged to lift each respective vertical cutting unit 12 of the first row 18 upwards and pivot it to a substantially vertical orientation. The vertical cutting unit 12 of the second row 20 is mounted on the mobile frame 16 by a second lifting means 24 including a second hydraulic ram 54, which is arranged to lift the vertical cutting unit 12 upwards.

Each bladed spindle 13 is driven by the drive mechanism 14. The drive mechanism 14 includes a hydraulic motor mechanically coupled to each of the spindles 13. In this way, each of the spindles 13 is driven independently of the others. The spindles 13 are rotated by the drive mechanism 14 faster than the speed of travel of the vertical cutter 10. The spindles 13 may be rotated at, for example, 1200 rpm. Debris created by the spinning bladed spindles 13 may be ejected through an opening in a protective casing of each vertical cutting units 12 which surrounds each of the bladed spindles 13. Each of the spindles is axially mounted within the respective protective case.

The mobile frame 16 includes a plurality of wheels 28 for providing mobility to the frame 16. Each vertical cutting unit of the spindles 13 may also include a pair of roller wheels 30, one located on either side of each spindle 13, for providing independent support to each of the vertical cutting units 12 as they travel along the turf in use. The roller wheels allow each vertical cutting unit 12 to follow the contours of the turf; The roller wheels 30 also position the respective bladed spindle 13 at a predetermined height above the turf such that the depth that the blades of each vertical cutting unit 12 penetrating into the turf can be adjusted by adjusting the height of the vertical position of the roller wheels 30 in relation to the bladed spindle.

Figure 2:
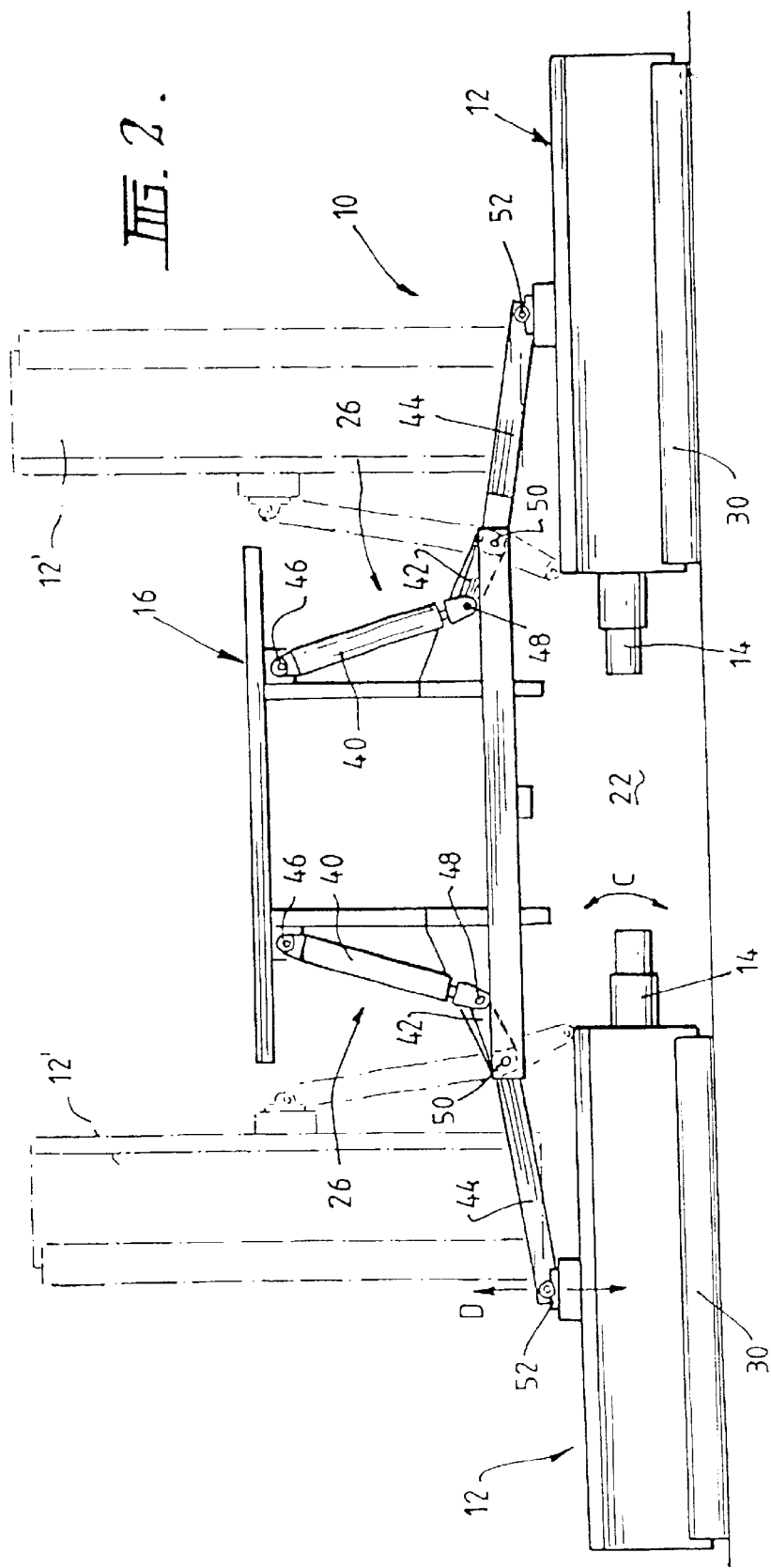
FIG. 2 is a cross-sectional view of a section A—A of FIG. 1.

In FIG. 2, the lifting means 26 are shown in greater detail. For convenience, only one of the lifting means 26 is described. The lifting means 26 includes a hydraulic ram 40 and a pivoting elongate member comprising a first length 42 and a second length 44. The first and second lengths 42 and 44 of the pivoting elongate member are separated by a fulcrum 50. The first length 42 is at an obtuse angle with respect to the second length 44. The hydraulic ram 40 is pivotally connected to the frame 16 at a first pivot point 46. The hydraulic ram 40 is also pivotally connected to the first length 42 of the pivoting elongate member at a second pivot point 48. The pivoting elongate member is pivotally mounted to the frame 16 at the fulcrum 50. The second length 44 of the pivoting elongate member is pivotally connected to the case of the respective vertical cutting unit 12 at a third pivot point 52.

The hydraulic ram 40 and pivoting elongate member are arranged such that extension of the hydraulic ram 40 causes the pivoting member to pivot about the fulcrum 50. This lifts the vertical cutting unit 12 connected to the second length 44 and also causes the vertical cutting unit 12 to pivot about the third pivot point 52, such that it pivots to be oriented substantially vertically, as shown in broken outline and indicated by reference number 12'.

The third pivot point 52 includes a shaft 70 as best seen in FIG. 1. The shaft 70 extends from the connection to the second length 44. The shaft 70 is fixed to the case of the vertical cutting unit 12 so as to allow pivotal movement of the vertical cutting unit 12, so that the vertical cutting unit 12 can roll sideways in order to follow lateral undulation of the turf, as indicated by arcuate double headed arrows C in FIG. 2.

The lifting means 26 may have a degree of play, such that the vertical cutting unit 12 may move up and down with respect to the frame 16. This allows the vertical cutting unit 12 to follow undulation of the turf in the same direction of travel as the vertical cutter 10, as indicated by double headed arrow D in FIG. 2.

Figure 3:
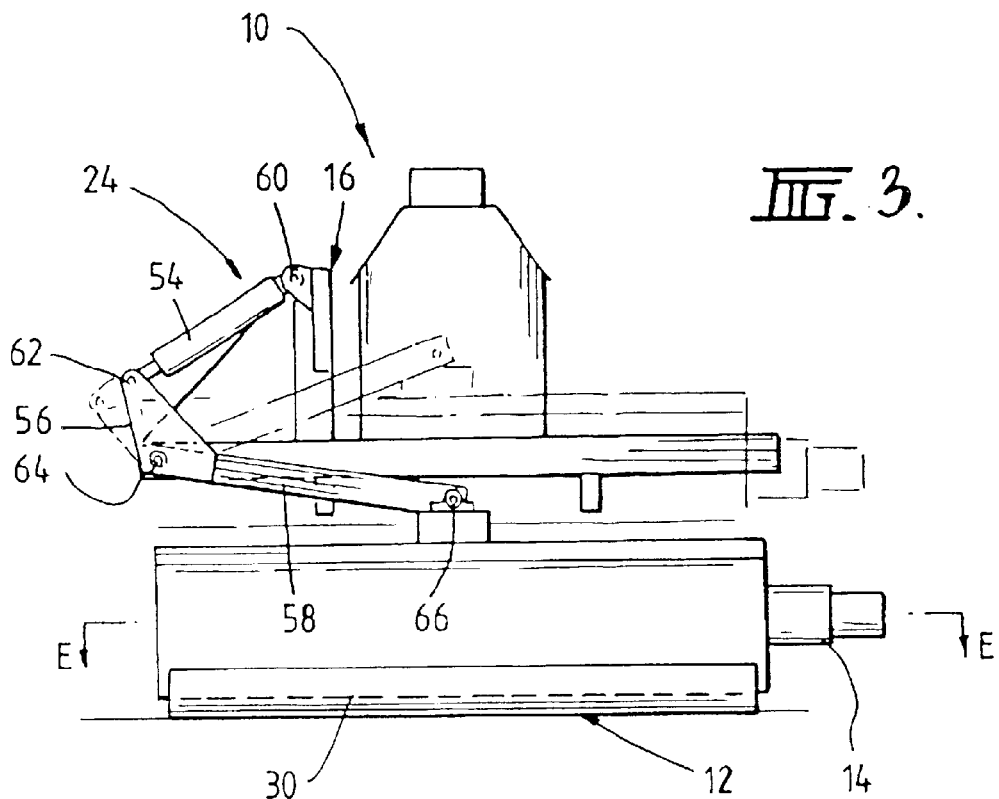
FIG. 3 is a rear view of the mobile vertical cutter of FIG. 1.
Figure 3A:
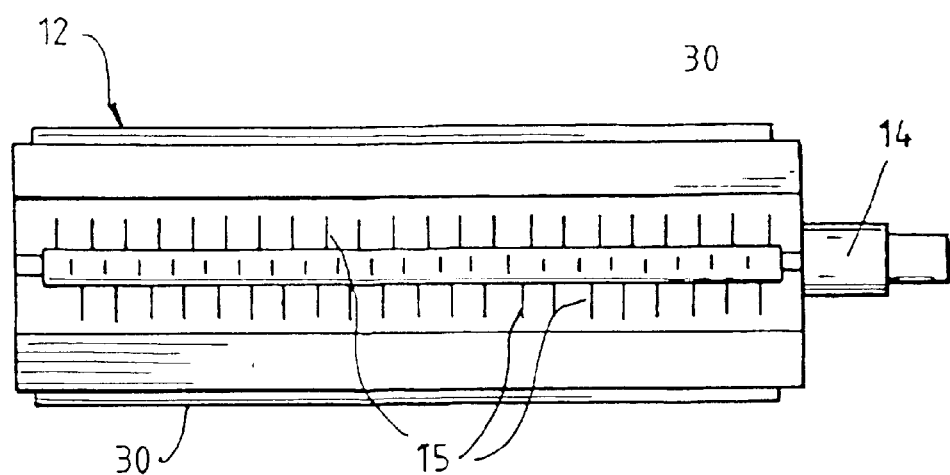
FIG. 3A is a top sectional view of the section E—E of FIG. 3 showing a bladed spindle; and, FIG. 4 is a side elevation of the mobile vertical cutter of FIG. 1.

In FIG. 3, the second lifting means 24 is shown in greater detail. The second lifting means 24 includes a hydraulic ram 54 and a pivoting member which includes a first length 56 and a second length 58. The first and second lengths 56 and 58 of the pivoting member are separated by a fulcrum 64. The first length 56 is at an obtuse angle with respect to the second length 58. The hydraulic ram 54 is pivotally connected to the frame 16 at a first pivot point 60. The first length 56 of the pivoting member is pivotally connected to the hydraulic ram 54 at a second pivot point 62. The pivoting member is pivotally mounted to the frame at the fulcrum 64. The second length 58 of the pivoting member is pivotally connected to the case of the vertical cutting unit 12 of the second row 20 at a third pivot point 66.

The hydraulic ram 54 and pivoting member are adapted to pivot in use such that extension of the hydraulic ram 54 causes the pivoting member to pivot about the fulcrum 64. This lifts the vertical cutting unit 12 such that the spindle 13 stays in a substantially horizontal orientation. The vertical cutting unit is shown in the lifted position in broken outline and is indicated by the reference number 12'.

The third pivot point 66 includes a shaft 72 as best seen in FIG. 1. The shaft 72 extends from the connection to the second length 58. The shaft 72 is fixed to the vertical cutting unit 12 so as to allow pivotal movement of the vertical cutting unit 12 in order to allow it to roll sideways to follow lateral undulation of the turf in a similar manner to the vertical cutting units 12 of the first row 18.

Figure 4:
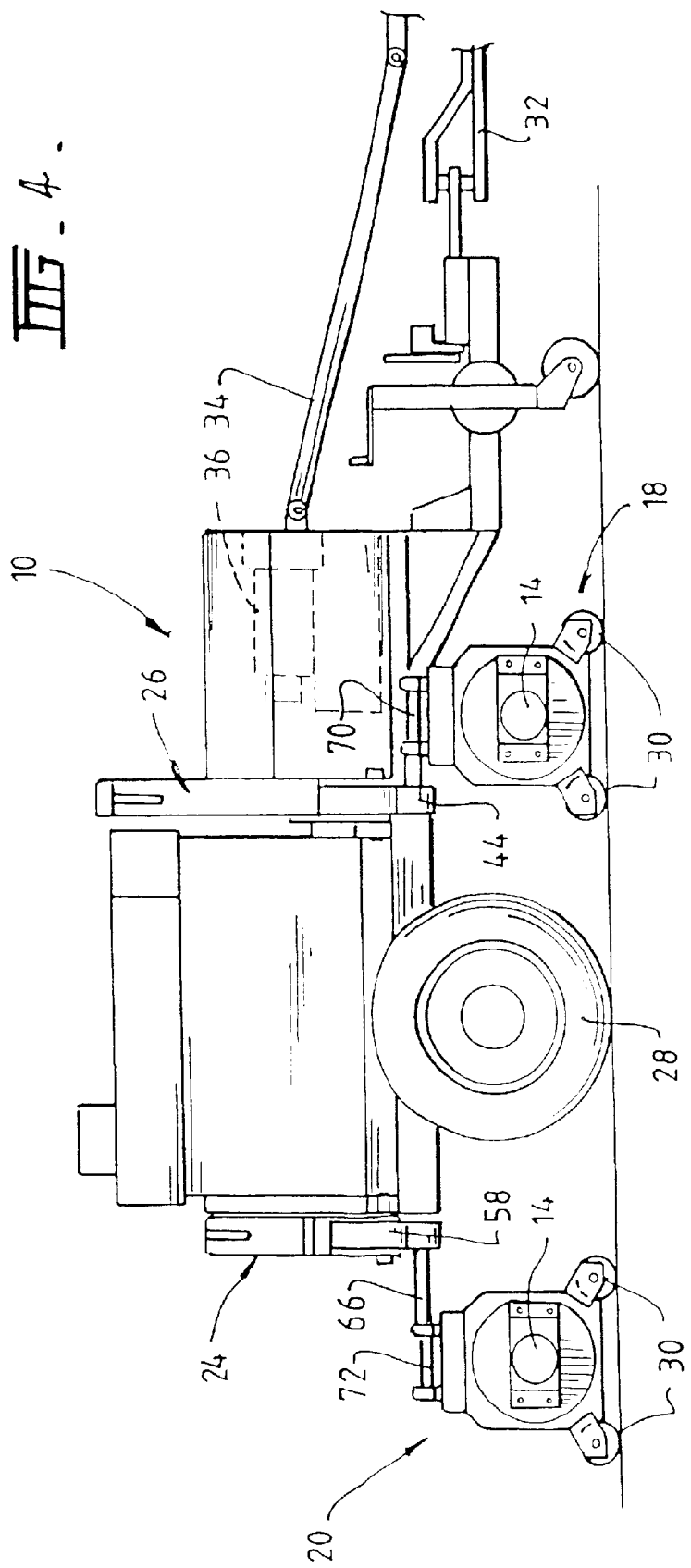

The lifting means 24 may have a degree of play, such that the vertical cutting unit 12 of the second row 20 may move up and down with respect to the frame 16 in a similar manner to the lifting means 26, in order to allow the vertical cutting unit 12 to follow undulation of the turf in the same direction of travel as the vertical cutter 10. The mobile vertical cutter 10, as shown in FIG. 4 further includes a hitch 32 for hitching to a towing vehicle in order for the mobile vertical cutter to be towed along. The mobile vertical cutter 10 also includes a drive shaft 34 to be connected to the power take off of the towing vehicle to drive a hydraulic pressure generator 36 used to provide hydraulic pressure to the hydraulic rams 24 and 26 and the drive mechanisms 14.

Alternatively, a mobile vertical cutter in accordance with the present invention may be self-propelled.

The method of use and operation of the present invention will now be described with reference to the accompanying drawings.

The mobile vertical cutter 10 is moved along an area of turf in a direction of travel as indicated by the arrow B in FIG. 1 or in the opposite direction. Preferably the direction of travel is the same as the direction of arrow B.

As the mobile vertical cutter 10 moves along, the spindles 13 are rotated by the drive mechanism 14 and blades of each vertical cutting unit 12 penetrate the turf to make vertical cuts therein. The vertical cutting units 12 of the first row 18, vertically cut two strips of turf separated by the gap 22. The vertical cutting unit 12 of the second row 20 vertically cuts the turf substantially over the gap 22 missed by the vertical cutting units 12 of the first row 18.

The vertical cutting units 12 are able to move up and down and pivot laterally with undulation of the turf. Each vertical cutting unit 12 is able to do so independently of the others. The roller wheels 30 allow the height of the spindles 13 from the ground to be adjusted and thus the depth of penetration of the blades is controlled.

The vertical cutting units 12 may be lifted by the lifting means 24 and/or 26 in order to avoid an obstacle or when the mobile vertical cutter 10 is no longer travelling on turf, such as on bituminised roads.

Now that preferred embodiments of the present invention have been described, advantages will become clear to the skilled addressee. The mobile vertical cutter is able to "verti-cut" large areas of turf in a comparatively small amount of time. Undulation in the area being verti-cut can be accommodated by the independent suspension and drive for each of the bladed spindles. Obstacles can be avoided by lifting a bladed spindle out of the way as the mobile vertical cutter passes by. Finally, the use of the hydraulics can reduce mechanical problems of wear and tear and eliminates the need for complex gear, differential and universal join mechanisms, thus minimising maintenance costs and prolonging the working life of the vertical cutter.

Modifications and variations as would be apparent to a skilled addressee are deemed to be within the scope of the present invention. Such modifications may include:

adding more rows of bladed spindles;

adding more bladed spindles per row; and pivotally mounting the bladed spindles so as to provide yawing movement.

The claims defining the present invention are as follows:

1. A mobile vertical cutter for making vertical cuts in turf, said mobile vertical cutter comprising:

a plurality of spindles, each spindle including a plurality of blades radially extending therefrom for making vertical cuts in turf, said spindles being arranged into at least a first row and a second row offset from the first row, each spindle being adapted to follow contours of the turf;

a drive mechanism for rotating each of the spindles; and a mobile frame including the bladed spindles and drive mechanism mounted thereon;

wherein, as the mobile cutter moves along, the spindles follow the contours of the turf, the drive mechanism rotates the spindles with respect to the frame and the blades make vertical cuts in the turf.

2. A mobile vertical cutter according to claim 1, wherein the first row includes two of the spindles spaced apart from one another and the second row includes one of the spindles substantially in line with the space between the two spindles of the first row, wherein, a swath of the turf is vertically cut as the mobile cutter moves along.

3. A mobile vertical cutter according to claim 1, wherein the drive mechanism includes a separate drive motor for each spindle, wherein each spindle is driven independently of each other.

4. A mobile vertical cutter according to claim 3, wherein said drive motor is a hydraulic motor coupled to each respective spindle.

5. A mobile vertical cutter according to claim 1, wherein each of the spindles is mounted on the mobile frame by a lifting means, for lifting the respective spindle in relation to the frame.

6. A mobile vertical cutter according to claim 5, wherein the lifting means of each spindle of the first row includes a first hydraulic ram, arranged to lift the respective spindle upward and pivot the respective spindle to an orientation in which a longitudinal dimension of the respective spindle is substantially vertically aligned.

7. A mobile vertical cutter according to claim 5, wherein the lifting means of the spindle of the second row includes a second hydraulic ram, arranged to lift the spindle of the second row upward in an orientation in which a longitudinal dimension of the spindle of the second row is substantially horizontally aligned.

8. A mobile vertical cutter according to claim 1, wherein each spindle is adapted to be laterally pivotable thereby allowing the spindle to better follow the contours of the turf.

9. A mobile vertical cutter according to claim 5, wherein the lifting means of each spindle is adapted to allow up and down movement of each spindle to allow the respective spindle to better follow the contours of the turf while the blades of the respective spindle engage the turf.

10. A mobile vertical cutter according to claim 1, wherein each spindle includes a height adjustment means for adjusting the depth that the blades penetrate the turf.

11. A mobile vertical cutter according to claim 1, wherein each spindle includes an elongate ground engaging roller coupled in front of and behind the respective spindle.

* * * * *